United States Patent
Paterson et al.

(10) Patent No.: US 6,406,507 B1
(45) Date of Patent: Jun. 18, 2002

(54) APPARATUS AND METHODS FOR SUPPORTING AND SHIELDING FLEXIBLE OUTER BAGS OF VACUUM CLEANERS

(75) Inventors: Chris M. Paterson, Long Beach, MS (US); Shane P. Cohen, Metairie, LA (US); Sam Ponjican, Gulfport, MS (US); Javier Verdura, Milford, CT (US)

(73) Assignee: Oreck Holdings, LLC, Cheyenne, WY (US)

( * ) Notice: Subject to any disclaimer, the term of this patent is extended or adjusted under 35 U.S.C. 154(b) by 0 days.

(21) Appl. No.: 09/675,269

(22) Filed: Sep. 29, 2000

(51) Int. Cl.[7] .............................. B01D 46/02; A47L 9/00
(52) U.S. Cl. .............................. 55/378; 55/368; 55/376; 55/DIG. 2; 15/323
(58) Field of Search .................... 55/361, 368, 371, 55/374, 376, 378, 381, DIG. 2, DIG. 3; 15/352, 353, 315, 323, 410

(56) References Cited

U.S. PATENT DOCUMENTS

| | | | |
|---|---|---|---|
| 3,498,031 A | * | 3/1970 | Fesco .......................... 55/368 |
| 3,654,661 A | | 4/1972 | Scott |
| 3,763,635 A | | 10/1973 | Schmitz |
| 3,971,643 A | | 7/1976 | Hufton |
| 4,182,618 A | | 1/1980 | Tschudy |
| 4,240,812 A | * | 12/1980 | Schaefer et al. ............... 55/369 |
| 4,349,361 A | | 9/1982 | Scott et al. |
| 4,514,200 A | | 4/1985 | Sumerau et al. |
| 4,566,884 A | | 1/1986 | Jones et al. |
| 4,701,975 A | | 10/1987 | Hampton et al. |
| 4,724,574 A | * | 2/1988 | Bowerman et al. ........... 55/378 |
| 5,007,133 A | | 4/1991 | Lackner et al. |
| D328,166 S | | 7/1992 | Lackner et al. |
| 5,216,779 A | | 6/1993 | Glenn, III |
| 5,222,276 A | | 6/1993 | Glenn, III |
| 5,230,121 A | | 7/1993 | Blackman |
| 5,367,741 A | | 11/1994 | Hampton et al. |
| 5,390,392 A | | 2/1995 | Thomas et al. |
| 5,414,893 A | | 5/1995 | Hampton et al. |
| 5,774,930 A | | 7/1998 | Sommer et al. |
| 5,961,676 A | * | 10/1999 | King et al. ............... 55/DIG. 3 |
| 6,033,451 A | * | 3/2000 | Fish et al. ..................... 55/378 |

* cited by examiner

*Primary Examiner*—David A. Simmons
*Assistant Examiner*—Minh-Chan T. Pham
(74) *Attorney, Agent, or Firm*—Faegre & Benson LLP

(57) ABSTRACT

Apparatus and methods of supporting and shielding flexible outer bags of vacuum cleaners are disclosed. In one embodiment, a support structure includes a backing plate adapted to be disposed within the flexible outer bag, and at least one support member attached to the backing plate and projecting away from the backing plate. The backing and support members are adapted to contact and extend proximate respective portions of the outer bag, providing three-dimensional support to the outer bag. Alternately, a plurality of airflow apertures may be disposed through the support structure. In another embodiment, a shield structure includes a backing member adapted to be positioned proximate to and extend over at least a portion of a rear panel of an outer bag of a vacuum cleaner. First and second sidewall members are attached to and project away from the backing member, the first and second sidewall members being adapted to be positioned proximate to and extend over at least a portion of corresponding lateral side panels of the outer bag. Alternately, the shield structure may include top and front shielding members.

36 Claims, 10 Drawing Sheets

APPARATUS AND METHODS FOR SUPPORTING AND SHIELDING FLEXIBLE OUTER BAGS OF VACUUM CLEANERS

TECHNICAL FIELD

The present invention relates to apparatus and methods of supporting and shielding flexible outer bags of vacuum cleaners.

BACKGROUND OF THE INVENTION

Vacuum cleaners are a pervasive and well-established appliance for commercial and residential floor care. A wide variety of vacuum cleaner configurations are available to suit the needs of a particular application or user, including upright vacuums, canister models, and hand-held models. A common element in many vacuum cleaner configurations is a flexible outer bag.

A prior art vacuum cleaner 20 with a flexible outer bag 22 is shown in FIG. 1. In this embodiment, the outer bag 22 includes a bag body 23 that has an enclosed end 24 and an openable end 25 that leads to an interior region (not shown) of the bag 20. In operation, dust and particulates are collected by a vacuum head 28 from a floor surface and are propelled by a flow of air into the interior region.

FIG. 2 shows another flexible outer bag 30 having an enclosed top edge 34, enclosed lateral edges 36A, 36B, and an openable front panel 35 that provides access to an interior region 34. A support means 32 supports the top edge 34, and small portions of the lateral edges 36A, 36B, of the flexible outer bag 30. The support means 32 includes a frame 33, which is attached to a backing plate 38. The frame 33 projects vertically from the backing plate 38 to support the top edge 34 of the bag 30, and extends laterally to support the upper regions of the lateral edges 36A, 36B. The frame 33 thus supports only the top edge 34, and a small portion of each lateral edge 36A, 36B. Support means 32 of the type shown in FIG. 2 are described more fully in U.S. Pat. No. 5,390,392 issued to Thomas et al.

The backing plate 38 (typically constructed of cardboard) is attached to the flexible outer bag 30 and has an aperture 39 disposed therethrough. The aperture 39 is aligned with an opening 31 in the flexible outer bag 30. The backing plate 38 may be mounted over an exhaust port (not shown) that projects into the interior region 35. An inner bag 40 may then be mounted over the exhaust port to receive the dirty air and particulate from the vacuum head.

FIG. 3 shows another prior art flexible outer bag 60 having an enclosed top edge 62, enclosed lateral edges 63, and an openable front panel 65 that provides access to an interior region (not shown). A support means assembly 50 supports the top edge 62 and also partially surrounds and protects the top edge 62 and small portions of the lateral edges 63 of the flexible outer bag 60. Support means assemblies of the type shown in FIG. 3 are described more fully in U.S. Pat. No. 4,662,913 issued to Vermillion.

Although desirable results are achievable using prior art the support means (FIGS. 2 and 3), certain problems still exist with respect to support and protection of the flexible outer bag. For example, the flexible outer bag may deform and come into contact with the inner bag. Such contact may decrease the efficiency of the vacuum cleaner because the inner bag may not fill with dirt or particulate to its maximum capacity. The areas of contact between the flexible outer bag and the inner bag may also reduce the airflow, and thus, the filtering efficiency of the vacuum cleaner. In addition, the prior art support means do little to protect the inner bag from being bumped or struck during operation of the vacuum cleaner which may cause damage to the flexible outer bag or the inner bag.

SUMMARY OF THE INVENTION

The present invention is directed toward structures and methods of supporting and shielding flexible outer bags of vacuum cleaners. In one aspect, a support structure includes a backing plate adapted to be disposed within the flexible outer bag, and at least one support member attached to the backing plate and projecting away from the backing plate. The backing and support members are adapted to contact and extend proximate respective portions of the outer bag, providing three-dimensional support to the outer bag. Alternately, a plurality of airflow apertures may be disposed through the support structure. In further aspects, the support member may be a support wall, a plurality of support tabs having airflow gaps therebetween, or may include a frame member.

In another aspect, a shield structure includes a backing member adapted to be positioned proximate to and extend over at least a portion of a rear panel of an outer bag of a vacuum cleaner. First and second sidewall members are attached to and project away from the backing member, the first and second sidewall members being adapted to be positioned proximate to and extend over at least a portion of corresponding lateral side panels of the outer bag. Alternately, the shield structure may further include a top member attached to and projecting away from the backing member, the top member being adapted to be positioned proximate to and extend over at least a portion of a top panel of the outer bag. In a further aspect, a front shielding member may be attached to the shield structure, the front member being adapted to be positioned proximate to and extend over at least a portion of a front panel of the outer bag.

DETAILED DESCRIPTION OF THE INVENTION

The present invention is directed to structures and methods of supporting and shielding flexible outer bags of vacuum cleaners. Many specific details of certain embodiments of the invention are set forth in the following description and in FIGS. 4 through 13 to provide a thorough understanding of such embodiments. One skilled in the art, however, will understand that the present invention may have additional embodiments, or combinations of the described embodiments, or that the present invention may be practiced without several of the details described in the following description.

Figure 1:
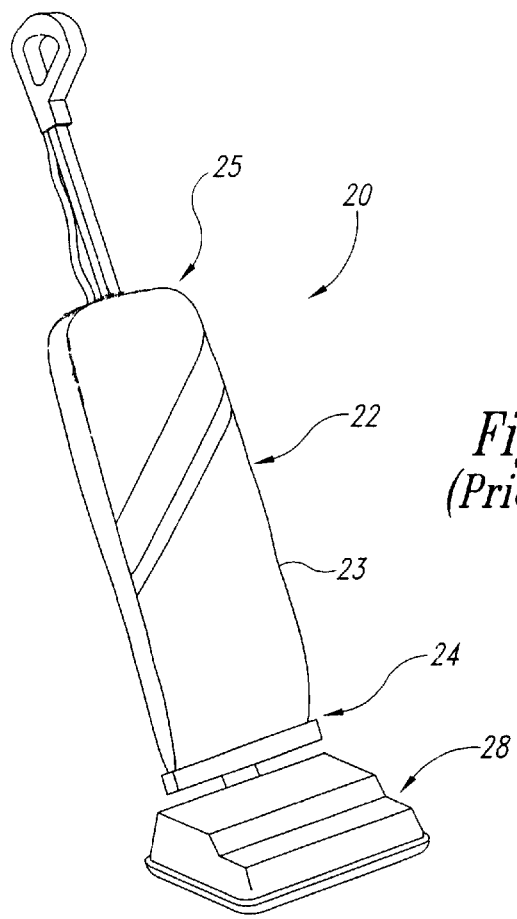
FIG. 1 is an isometric view of a vacuum cleaner having a flexible outer bag in accordance with the prior art.
Figure 2:
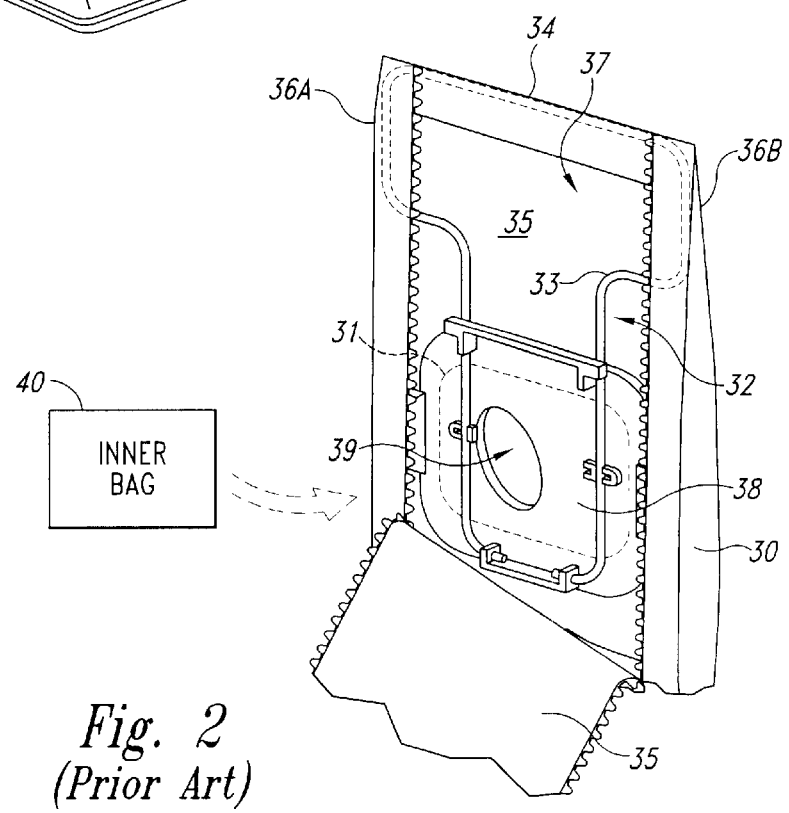
FIG. 2 is a partial isometric view of a flexible outer bag having a support means in accordance with the prior art.
Figure 3:
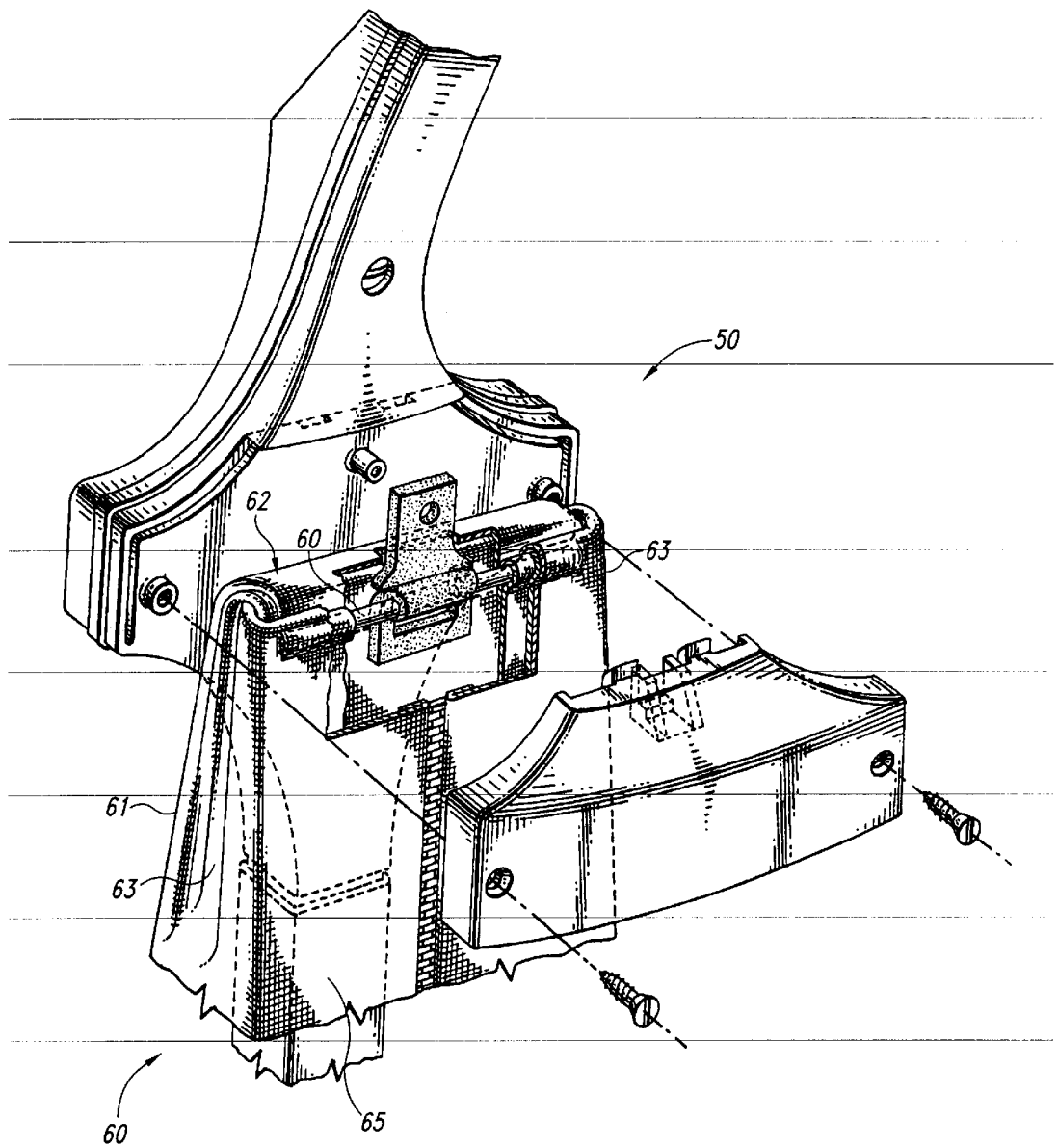
FIG. 3 is a partial isometric view of another flexible outer bag having a support means in accordance with the prior art.
Figure 4:
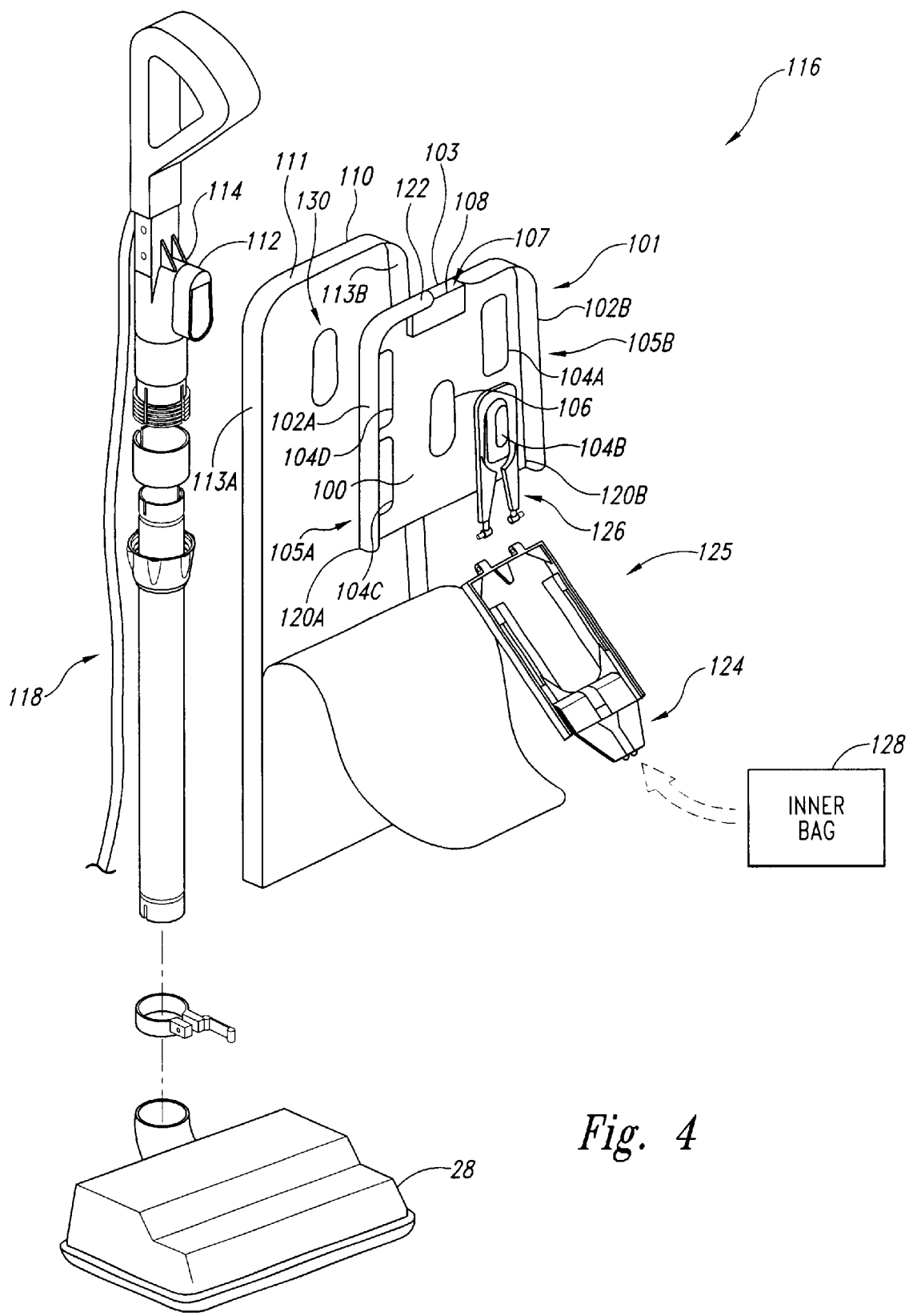
FIG. 4 is an exploded isometric view of a vacuum cleaner in accordance with an embodiment of the invention.

FIG. 4 is an exploded isometric view of a vacuum cleaner having a support structure 101 for a flexible outer bag 110 in accordance with an embodiment of the invention. In this embodiment, the support structure 101 includes a backing plate 100, and a plurality of support walls 102A, 102B attached to top 103 and lateral edges 105 of the backing plate 100. The support walls 102A, 102B project away from the backing plate 100 at an approximately ninety degree angle. A first (or upper) portion of each support wall 102A, 102B engages against an upper panel 111 of the flexible outer bag 110, and a second (or lateral) portion of each support wall 102A, 102B engages against a lateral panel 113A, 113B of the flexible outer bag 110. The backing plate 100 also includes an aperture 106 sized to mount over an exhaust port 112 of the vacuum cleaner. A plurality of airflow apertures 104A-D are disposed through the backing plate 100 to allow air to flow through the backing plate 100 and out of the flexible outer bag 110.

The backing plate 100 and support walls 102 may be constructed of any suitable, approximately rigid materials, including plastic, metal, or even a porous material, including, for example, stiffened cellulose (i.e. paper), synthetic or natural fiber materials. Alternately, the backing plate 100 and support walls 102 may be constructed of grating, such as expanded sheet metal, as described more fully below. One skilled in the art, however, will readily understand that a wide variety of different materials may be used.

During assembly, the support structure 101 may be installed within the flexible outer bag 110 by mounting it over the exhaust port 112. It may also be attached to the vacuum cleaner 116 by other means, such as by attaching it to any suitable area of the vacuum cleaner proximate to the flexible outer bag 110. The support walls 102A, 102B engage against, and provide support to, the upper and lateral panels 111, 113A, 113B of the outer bag 110.

In this embodiment, the vacuum cleaner also includes a bag dock assembly 125 having a yoke 126 hingeably attached to a bag dock 124. The bag dock assembly 125 is mounted over the exhaust port 112. The bag dock 124 receives an inner bag 128, which collects dirt and particulate from the exhaust port 112. Bag dock assemblies of the type shown in FIG. 4 are described more fully, for example, in U.S. Pat. No. 6,033,451 issued to Fish et al, which patent is incorporated herein by reference.

A gap 107 is disposed between the support walls 102A, 102B along the top edge 103 of the support structure 101. The gap 107 provides access to the rear of the bag dock 124 to effectuate detachment of the bag dock 124 from the yoke 126, allowing a user to hinge the bag dock 124 downwardly for removal or installation of the inner bag 128. In the assembled position, the support structure 101 partially surrounds the bag dock assembly 125 and the inner bag 128. In operation, dirt and particulate are collected from a floor surface by the vacuum head 28 and are propelled upwardly through an exhaust assembly 118. The dirty airstream exits from the exhaust port 112 and enters the inner bag 128, which filters the dirt and particulate from the dirty airstream. The resulting clean air flows out of the porous inner bag 128, through the porous, flexible outer bag 110, and into the surrounding room. At least some of the clean air emanating from the inner bag 128 may flow through the plurality of airflow apertures 104 en route to the porous outer bag 110. The backing plate 100 and support walls 102 maintain the desired three dimensional shape of the outer bag 110.

The support structure 101 provides several advantages over existing vacuum cleaner bag support means. For example, the support structure 101 provides support for the flexible outer bag 110 in three dimensions. Because the support walls 102 of the support structure 101 project outwardly from the backing plate 100 along the upper and lateral panels 111, 11 3A, 11 3B of the outer bag 110, the support structure 101 provides improved support for the outer bag 110, and may prevent the flexible outer bag 110 from collapsing on and contacting the inner bag 128. This maintains the outer bag 110 in its aesthetically pleasing, three-dimensional shape, and may allow the inner bag 128 to collect more dirt and particulate. The support structure 101 may also maintain or improve the filtration efficiency of the vacuum cleaner. In addition, because the support structure 101 partially surrounds the inner bag 128, it may protect the inner bag 128 from damage by providing a rigid structure surrounding the inner bag 128 from the top, sides and rear. For vacuum cleaner embodiments having a bag dock assembly 125, the support structure 101 may also advantageously provide protection to this assembly.

Several alternate embodiments of support structures in accordance with the invention will be described below. Generally, in the following discussion, where the construction and operation of alternate embodiments is substantially similar to previously described embodiments, the common elements and features are identified by reference numbers which are the same or similar to those used above. Only significant differences in construction or operation are described in detail.

Figure 5:
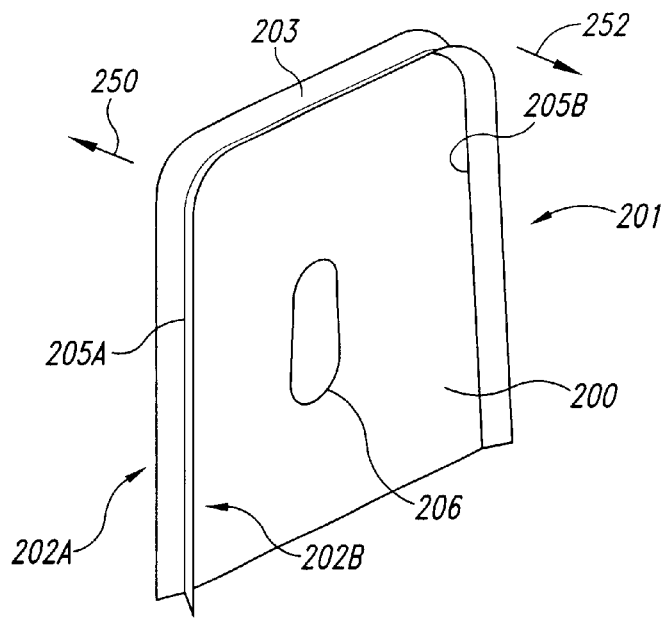
FIG. 5 is an isometric view of a support structure in accordance with an alternate embodiment of the invention.

FIG. 5 is an isometric view of a support structure 201 in accordance with an alternate embodiment of the invention. In this embodiment, the support structure 201 includes a backing plate 200 having a pair of support walls 202A, 202B disposed about top 203 and lateral 205 edges thereof. One support wall 202B extends outwardly in a first (or anterior) direction 250 from the backing plate 200, and the other wall 202A extends outwardly in a second (or posterior) direction 252 from the backing plate. An aperture 206 sized to mount over the exhaust port 112 of a vacuum cleaner is disposed through the backing plate 200. In this embodiment, the support walls 202A, 202B do not project at right angles from the backing plate 200. In alternate embodiments, the support walls 202A, 202B may be normal to the backing plate. In a further embodiment, one of the support walls (e.g. support wall 202A) may be eliminated, providing a support structure embodiment having a single, continuous support wall projecting outwardly from the backing plate 200.

The operation of the support structure 201 is substantially the same as described above. The support walls 202A, 202B engage and support the upper and lateral panels 111, 113A, 113B of the outer bag 110. The support structure 201 advantageously provides support for the flexible outer bag 110 in both the anterior and posterior directions. Thus, three-dimensional support may be provided to a variety of outer bag configurations. The support structure 201 may also provide added protection to the inner bag 128 and other components of the vacuum cleaner.

Figure 6:
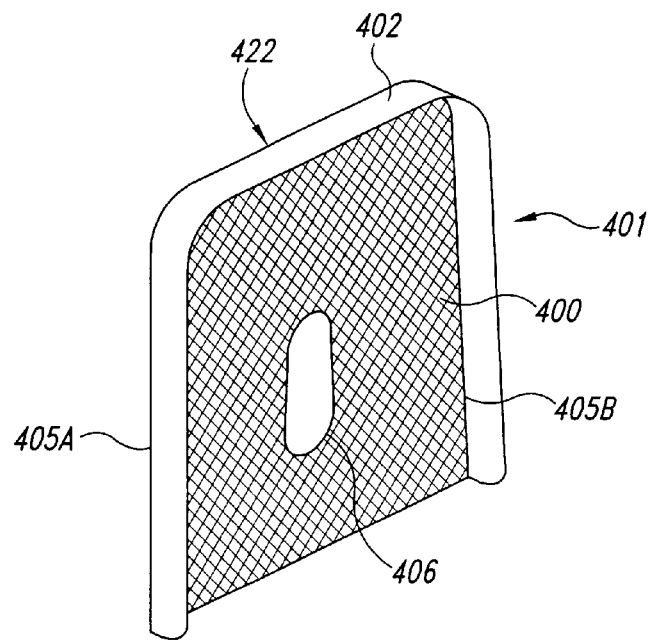
FIG. 6 is an isometric view of yet another embodiment of the support structure in accordance with the invention.

FIG. 6 is an isometric view of a support structure 401 in accordance with another embodiment of the invention. In this embodiment, the backing plate 400 is constructed of porous grating. An aperture 406 sized to mount over the exhaust port 112 of a vacuum cleaner 116 is disposed through the backing plate 400. A support wall 402 is attached to top 422 and lateral edges 405A, 405B of the backing plate 400. Alternately, a plurality of support walls may also be used. In addition, the support wall 402 may also be constructed of grating.

The support structure 401 having a backing plate 400 constructed of a porous grating material (FIG. 7) may provide improved airflow through the backing plate 400. Because the entire backing plate 400 is porous, the clean air emanating from the inner bag 128 may exit from the walls of the inner and outer bags 128, 110 more uniformly and relatively unimpeded by the support structure. This may result in improved performance and filtration efficiency of the vacuum cleaner.

Figure 7:
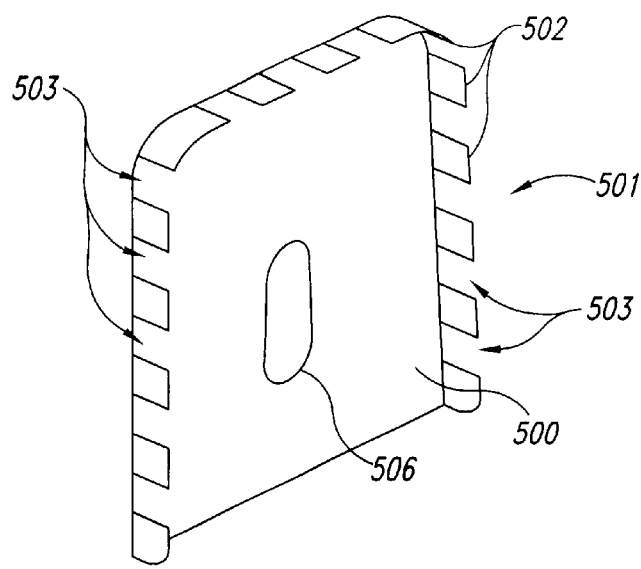
FIG. 7 is an isometric view of a further embodiment of a support structure in accordance with the invention.

FIG. 7 is an isometric view of another embodiment of an support structure 501 having a plurality of support tabs 502 projecting away from a backing plate 500. A plurality of airflow gaps 503 are provided between adjacent support tabs 502. An aperture 506 sized to mount over the exhaust port of a vacuum cleaner is located within the backing plate 500, as described above.

One advantage of the support structure 501 having the plurality of support tabs 502 is that clean air emanating from the inner bag 128 may flow through the airflow gaps 503. This feature may further improve the uniformity of the airflow from the inner and outer bags 128, 110, and ultimately, the performance of the vacuum cleaner. In addition, the weight of the vacuum cleaner and the cost of materials may be decreased by use of support tabs.

Figure 8:
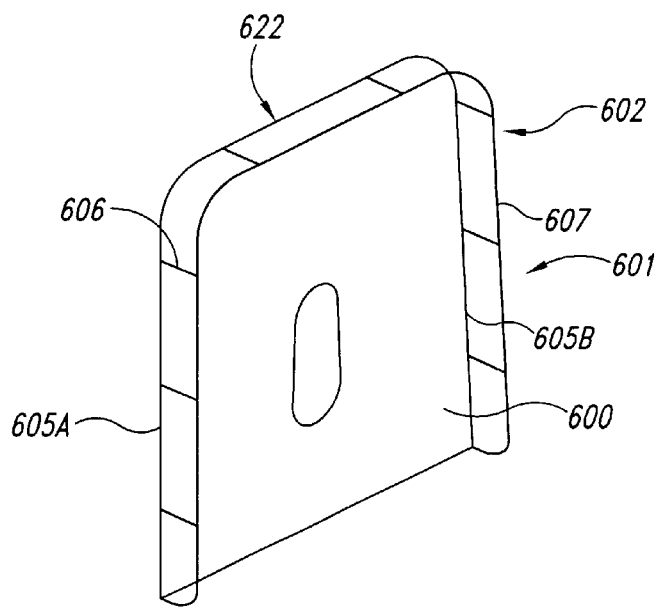
FIG. 8 is an isometric view of another alternate embodiment of a support structure in accordance with the invention.
Figure 9A:
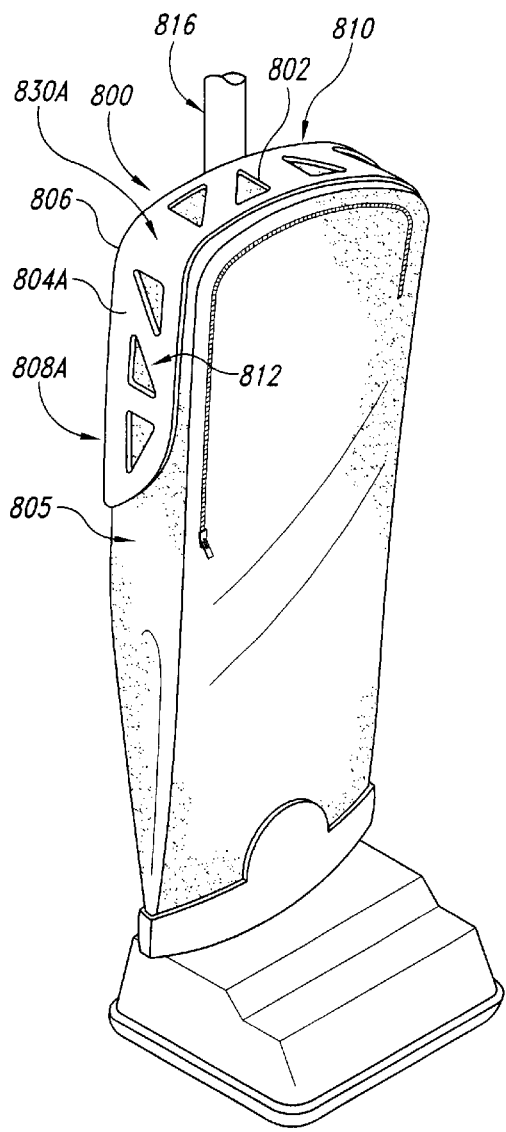
FIG. 9A is a front isometric view of a vacuum cleaner in accordance with an alternate embodiment of the invention.
Figure 9B:
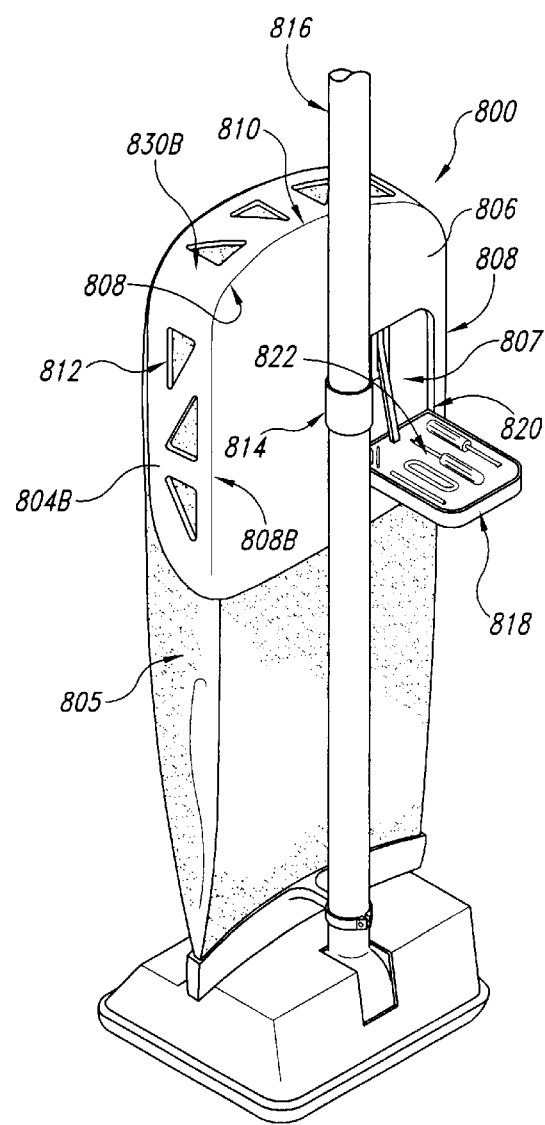
FIG. 9B is a rear isometric view of the vacuum cleaner of FIG. 9A.

FIG. 8 shows an isometric view of a support structure 601 in accordance with yet another support structure embodiment. In this embodiment, the support structure 601 includes a solid backing plate 600 having a support frame 602 projecting outwardly therefrom. The support frame 602 has an outer framing member 607 that forms the distal border of the support frame. A plurality of leg members 606 extend between the backing plate 600 and the outer framing member 607, and provide support for the outer framing member 607, as well as protection for the inner bag (FIG. 4). Although a single support frame 602 is shown in FIG. 8, in alternate embodiments, the support frame 602 may be divided into a plurality of sub-frames similar to the multi-walled structures described above and shown in FIGS. 4 and 7. Alternately, an additional support frame may be added which projects away from the backing plate 600 in a different (preferably opposing) direction, similar to the structure shown in FIG. 5. FIGS. 9A and 9B show front and rear isometric views, respectively, of a vacuum cleaner in accordance with another embodiment of the invention. In this embodiment, a shield structure 800 is mounted over an exterior portion of a flexible outer bag 805 of the vacuum cleaner. The support structure 800 includes a backing plate 806 coupled to a handle 816 by a clamp 814. A pair of protective sidewalls 804A, 804B, and a protective top wall 802 extend outwardly from the backing plate 806 along top and lateral panels of the outer bag 805. The protective sidewalls 804A, 804B are attached to side edges 830A, 830B of protective top wall 802, and to lateral edges 808A, 808B of the backing plate 806, and project away from the backing plate 806 at an approximately ninety degree angle. A plurality of airflow apertures 812 are about the sidewalls 804A, 804B to allow air to flow through the flexible outer bag 805. As shown in FIG. 9B, the shield structure 800 may also include a door 818 hingeably attached to the backing plate 806. The door 818 includes a plurality of recesses 822 for securing tools to the door 818. One may note that the flexible outer bag 805 may be attached to the shield structure 800 at one or more locations on an internal surface of the shield structure 800. Attaching the flexible outer bag 805 to the shield structure 800 may thereby provide support to the three-dimensional shape of the flexible outer bag 805. The flexible outer bag 805 may be attached to the shield structure 800 with any suitable fasteners, such as velcro, thread, rivets, or adhesives. Alternately, the outer bag 805 may remain unattached from the shield structure 800, and may be supported by one of the support structure embodiments shown and described above.

The shield structure 800 may advantageously provide protection and support for the flexible outer bag 805. Because the shield structure 800 partially surrounds the back, top, and lateral edges of the outer bag 805, the shield structure 800 may absorb bumps or blows that would otherwise strike the outer bag 800. The shield structure 800 therefore provides protection to the flexible outer bag 805 and may prevent damage resulting from blows sustained while operating the vacuum cleaner. Furthermore, the shield structure 800 may prevent the flexible outer bag 805 from collapsing on the inner bag, thereby increasing the performance and efficiency of the vacuum cleaner.

A variety of alternate shielding structures in accordance with the invention will be described below. Generally, where the construction and operation of alternate embodiments is substantially similar to previously described embodiments, the common elements and features are identified by the same or similar reference numbers, and only significant differences in construction or operation are described in detail.

Figure 10A:
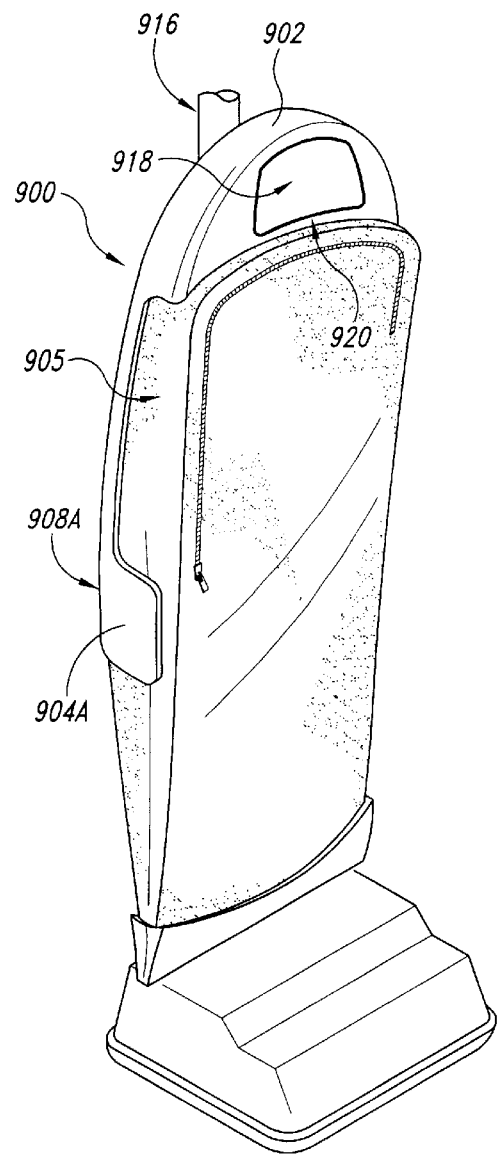
FIG. 10A is a front isometric view of an alternate embodiment of a vacuum cleaner in accordance with the invention.
Figure 10B:
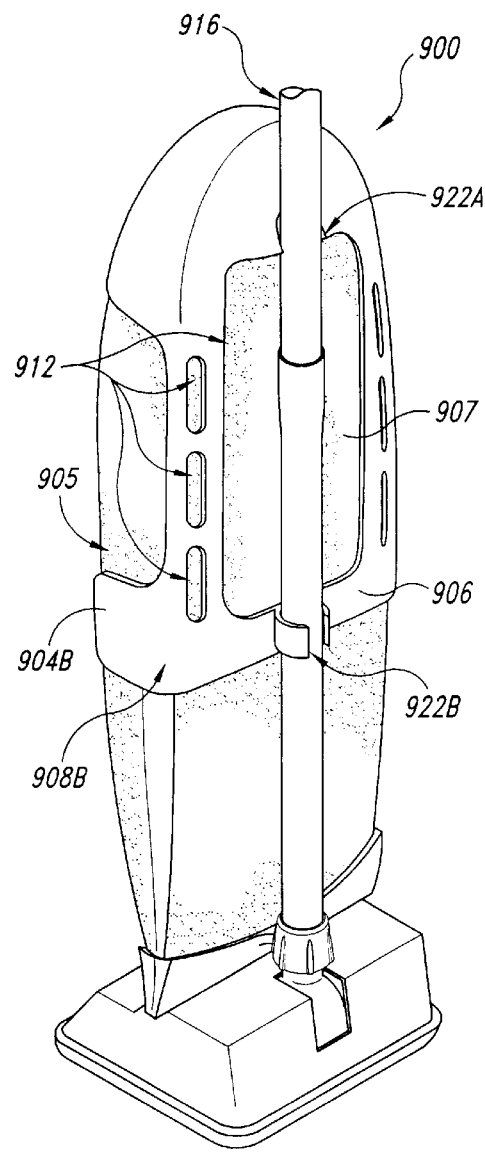
FIG. 10B is a rear isometric view of the vacuum cleaner of FIG. 10A.

FIGS. 10A and 10B show front and rear isometric views, respectively, of another embodiment of a vacuum cleaner in accordance with the invention. In this embodiment, the vacuum cleaner includes a shield structure 900 having a backing member 906 with a large airflow portal 907 (FIG. 10B) disposed therethrough. A pair of side guards 904A, 904B, and a top member 902 are attached to the backing member 906 and project forwardly along lateral and top panels, respectively, of the flexible outer bag 905. As best shown in FIG. 10A, the top member 902 may be spaced apart from the top panel of the outer bag 905 to form a compartment. In this embodiment, the top member 902 includes a door 918 leading into the compartment.

As shown in FIG. 10B, a plurality of airflow apertures 912 are distributed about lateral edges 908A, 908B of the backing member 906 to allow air to flow through the backing member 906. Clamps 922A, 922B on the backing member 906 attach the shield structure 900 to the handle 916 of the vacuum cleaner.

The shield structure 900 may provide the above-noted advantages of protecting and supporting the inner and outer bags, and may further provide 20 improved airflow and reduced weight over alternate shield structures. For example, because the side guards 904A, 904B are smaller and extend only partially over the lateral panels of the outer bag, the shield structure 900 may be lighter than alternate embodiments. The weight of the shield structure 900 may be further reduced because the amount of material used to form the backing member 906 is reduced by the large airflow portal 907. Furthermore, the airflow through the shield structure 900 is improved over alternate embodiments by the large airflow portal 907, the plurality of apertures 912, and the relatively small side guards 904A, 904B.

Figure 11A:
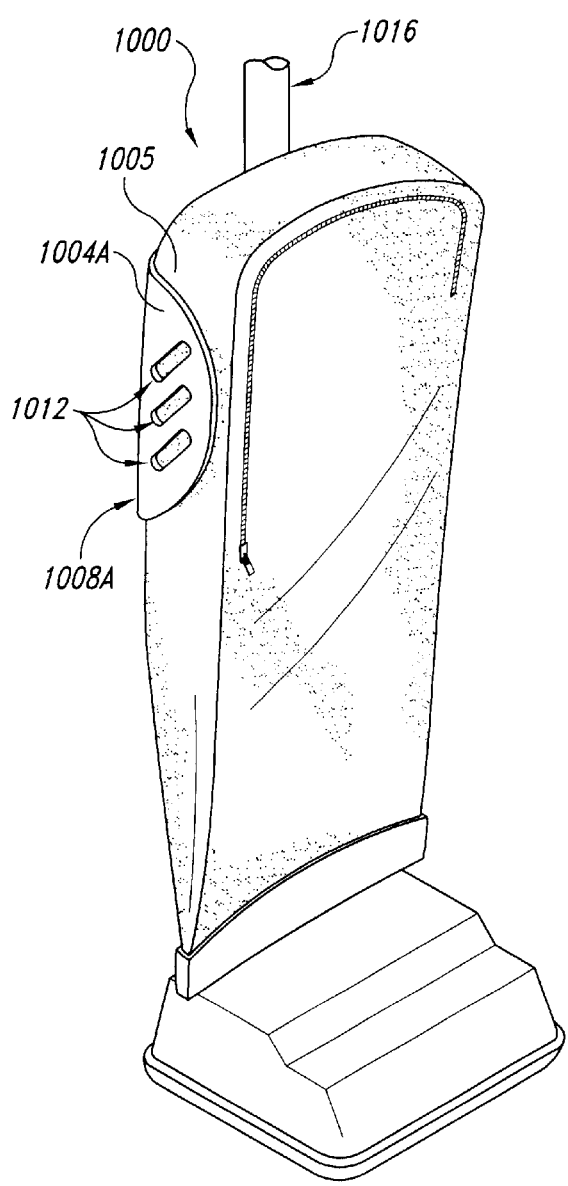
FIG. 11A is a front isometric view of another alternate embodiment of a vacuum cleaner in accordance with the invention.
Figure 11B:
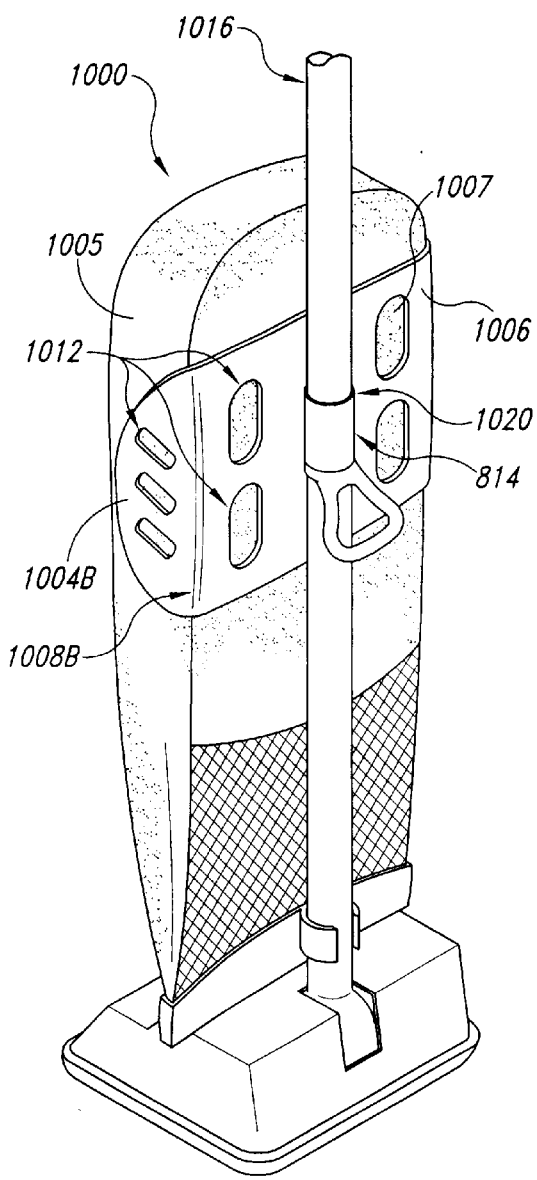
FIG. 11B is a rear isometric view of the vacuum cleaner of FIG. 11A.
Figures 12A, 12B:
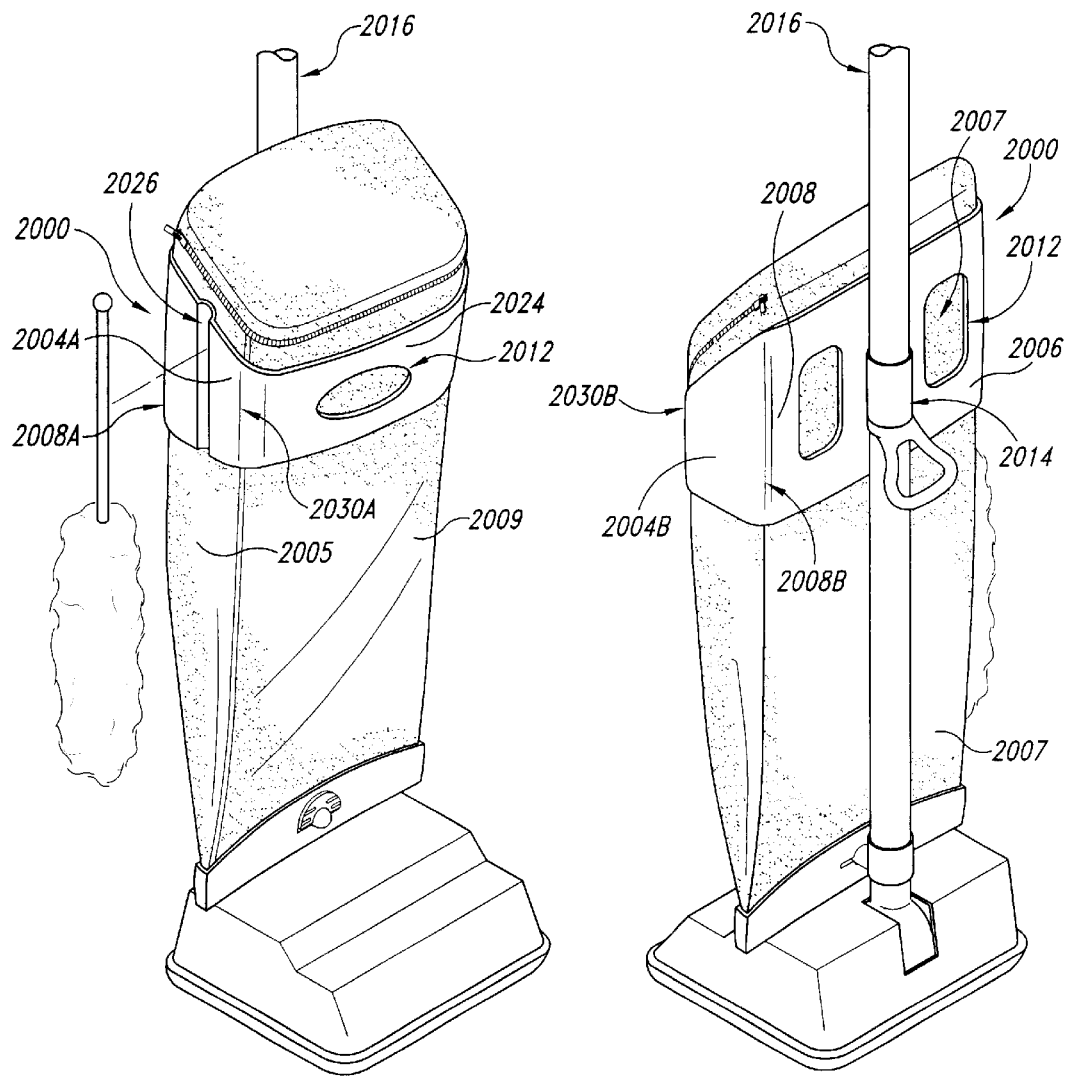
FIG. 12A is a front isometric view of yet another embodiment of a vacuum cleaner in accordance with the invention.
FIG. 12B is a rear isometric view of the vacuum cleaner of FIG. 12A.

FIGS. 11A and 11B show front and rear isometric views, respectively, of yet another vacuum cleaner embodiment in accordance with the invention. In this embodiment, the vacuum cleaner includes a shield structure 1000 having a backing plate 1006, and sidewalls 1004A, 1004B. A plurality of airflow apertures 1012 are distributed about the backing plate 1006 and the sidewall members 1004A, 1004B. The shield structure 1000 may provide the above described advantages of partially supporting, shielding, and protecting the outer and inner bags of the vacuum cleaner in an embodiment that further reduces weight and further improves airflow through the shield structure compared with other, previously described embodiments. FIGS. 12A and 12B are front and rear isometric views, respectively, of a vacuum cleaner in accordance with yet another embodiment of the invention. In this embodiment, the vacuum cleaner includes a shield structure 2000 having a front member 2024 that extends over a portion of a front panel 2009 of the flexible outer bag 2005.

Similar to the above-described embodiments, the shield structure 2000 also includes a backing plate 2006 that extends over a portion of a back panel 2007 of the outer bag 2005, and a pair of sidewalls 2004A, 2004B that extend over respective portions of lateral panels of the outer bag. The front plate 2024 is attached to and extends between the opposing distal edges 2030A, 2030B of the sidewalls 2004A, 2004B. A plurality of airflow apertures 2012 are distributed through the backing plate 2006 and the front plate 2024. A clamp 2014 secures the backing plate 2006 to the handle 2016 of the vacuum cleaner.

As shown in FIG. 12A, in this embodiment, the shield structure 2000 includes a tool recess 2026 formed in one of the sidewalls 2004A. The tool recess 2026 is sized to closely receive a handle of a cleaning tool (e.g. a feather duster).

The shield structure 2000 provides support and shielding over the front panel of the outer (and inner) bag 2005, as well as the back and lateral panels. In alternate embodiments, the shield structure 2000 may be adjusted upwardly or downwardly on the handle 2016 to provide protection and support over alternate portions of the outer bag 2005. For example, when the vacuum cleaner is used in commercial settings, it may be desirable to lower the shield structure 2000 to protect portions of the outer bag 2005 that are more frequently bumped or struck, for example, when vacuuming under desks or other office furniture. Conversely, in a residential setting, the operator may desire to have the shield structure 2000 positioned higher on the outer bag 2005 to protect portions of the bag that are more frequently bumped, for example, when vacuuming under a table or a countertop.

Figures 13A, 13B:
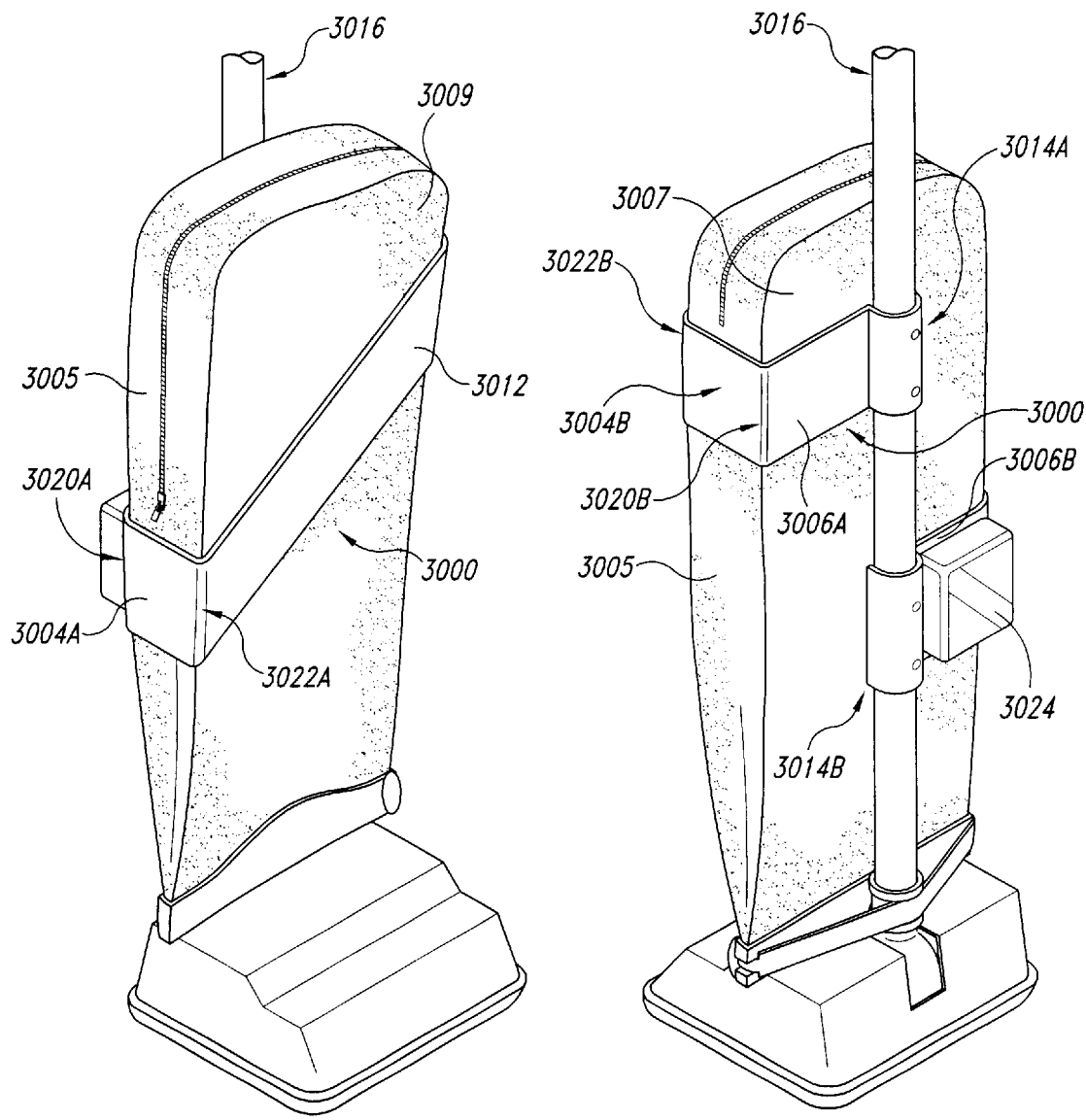
FIG. 13A is a front isometric view of yet another embodiment of a vacuum cleaner in accordance with the invention.
FIG. 13B is a rear isometric view of the vacuum cleaner of FIG. 13A.

FIGS. 13A and 13B show front and rear isometric views, respectively, of yet another vacuum cleaner in accordance with another embodiment of the invention. In this embodiment, the vacuum cleaner includes a shield structure 3000 having a front member 3012 that extends diagonally over a portion of a front panel of the flexible outer bag 3005. First and second backing members 3006A, 3006B are attached to a handle 3016 of the vacuum cleaner by first and second attachment assemblies 3014A, 3014B. A compartment 3024 is attached to the second backing member 3006B. First and second sides 3004A, 3004B project in a forward direct from the first and second backing members 3006A, 3006B, respectively, extending over portions of the lateral panels of the vacuum cleaner. The front member 3012 is attached to the opposing distal edges 3022A, 3022B of the sides 3004A, 3004B. Similar to the previously described embodiment, the shield structure 3000 having the front member 3012 provides desirable support and shielding over the front panel of the outer (and inner) bag 3005, as well as over portions of the back and lateral panels.

It should be understood that various features of the above-described embodiments may be combined to provide additional embodiments of support and shield structures in accordance with the invention. For example, tool compartments (FIGS. 10A and 13B) and tool recesses (FIG. 12A) may be added to any of the above-described embodiments. Furthermore, any of the above described structures may be formed of porous grating material, as shown and described above with reference to FIG. 6. Also, a front shielding member (shown in FIGS. 12 and 13) may be added to shield structures having top and side members (e.g. FIGS. 9 and 10), or conversely, top members may be added to the embodiments having front shielding members. Finally, the sizes and extents of the various side, top and back members of the structures described above may be adjusted to provide any desired degree of shielding or support to the outer bag.

Although support and shielding structures are shown and described above as being used in connection with an upright vacuum cleaner, the invention may have numerous embodiments and may be practiced in conjunction with different vacuum cleaner configurations. For example, additional embodiments may be configured to operate with flexible containment members of other floor-mounted vacuum cleaners, hand-held vacuum cleaners, or other types of vacuum cleaners that operate in conjunction with a flexible outer bag.

The detailed descriptions of the above embodiments are not exhaustive descriptions of all embodiments contemplated by the inventors to be within the scope of the invention. Indeed, persons skilled in the art will recognize that certain elements of the above-described embodiments may variously be combined or eliminated to create further embodiments, and such further embodiments fall within the scope and teachings of the invention. It will also be apparent to those of ordinary skill in the art that the above-described embodiments may be combined in whole or in part with prior art methods to create additional embodiments within the scope and teachings of the invention.

Thus, although specific embodiments of, and examples for, the invention are described herein for illustrative purposes, various equivalent modifications are possible within the scope of the invention, as those skilled in the relevant art will recognize. The teachings provided herein of the invention can be applied to other support and shielding structures, and not just to the support and shielding structures for flexible outer bags of vacuum cleaners described above and shown in the figures. In general, in the following claims, the terms used should not be construed to limit the invention to the specific embodiments disclosed in the specification. Accordingly, the invention is not limited by the foregoing disclosure, but instead its scope is to be determined by the following claims.

What is claimed is:

1. A support structure for use within a flexible outer bag of a vacuum cleaner having an exhaust port, comprising:
   a backing plate adapted to be disposed within the flexible outer bag proximate to the exhaust port and having a peripheral edge and an intake aperture sized to receive the exhaust port; and
   at least one support member attached to the backing plate proximate the peripheral edge and projecting away from the backing plate, at least part of the support member being adapted to contact and extend along at least a portion of the flexible outer bag.

2. The support structure according to claim 1 wherein the at least one support member projects away from the backing plate at an approximately ninety degree angle.

3. The support structure according to claim 1 wherein the backing plate includes at least one airflow aperture disposed therethrough.

4. The support structure according to claim 1 wherein the backing plate comprises a grate.

5. The support structure according to claim 1 wherein the backing plate comprises a porous material.

6. The structure according to claim 1 wherein the at least one support member comprises a support wall.

7. The structure according to claim 1 wherein the at least one support member comprises a plurality of support tabs, each pair of adjacent support tabs having an airflow gap therethrough.

8. The structure according to claim 1 wherein the at least one support member comprises a first support member projecting away from the backing plate in a first direction, further including a second support member projecting away from the backing plate in a second direction.

9. A vacuum cleaner having an exhaust port for exhausting a flow of dirty air into a flexible outer bag, comprising:
   a backing plate disposed within the flexible outer bag proximate to the exhaust port and having a peripheral edge and an intake aperture sized to receive the exhaust port; and
   at least one support member attached to the backing plate proximate the peripheral edge and projecting away from the backing plate, at least part of the support member being adapted to contact and extend along at least a portion of the flexible outer bag.

10. The vacuum cleaner according to claim 9, further comprising a filter element support disposed within the flexible outer bag proximate to the exhaust port.

11. The vacuum cleaner according to claim 9 wherein the backing plate further includes at least one airflow aperture disposed therethrough.

12. The vacuum cleaner according to claim 9 wherein the backing plate comprises a grate.

13. The vacuum cleaner according to claim 9 wherein the at least one support member comprises a first support wall, further comprising a second support wall attached to the peripheral edge and projecting away from the backing plate.

14. The vacuum cleaner according to claim 9 wherein the at least one support member comprises a plurality of support tabs, each pair of adjacent support tabs having an airflow gap therethrough.

15. A method of supporting a flexible outer bag of a vacuum cleaner, comprising:
   supporting the flexible outer bag in a first dimensional direction with a support assembly disposed within the outer bag;
   supporting the flexible outer bag in a second dimensional direction orthogonal to the first dimensional direction; and
   supporting the flexible outer bag in a third dimension orthogonal to the first and second dimensional directions.

16. The method according to claim 15 wherein supporting the flexible outer bag in a first dimensional directional with a support assembly comprises supporting a side panel of the flexible outer bag in a first dimensional direction using a support member attached to and projecting away from a backing plate in the first dimensional direction.

17. The method according to claim 15, further comprising providing airflow holes in the three-dimensional structure to allow increased airflow into the bag.

18. The method of claim 15 wherein the vacuum cleaner includes a bag dock for mounting an inner bag, and the three-dimensional structure includes a plurality of walls projecting from a backing plate, and wherein the method further comprises providing a gap in the walls proximate to the bag dock for accessing the bag dock.

19. A shield structure for use on an exterior of a flexible outer bag of a vacuum cleaner having top, rear and lateral side panels, comprising:
   a backing member having a top edge and opposing lateral edges, the backing member being adapted to attach to the vacuum cleaner and being further adapted to be positioned proximate to and extend over at least a portion of the rear panel of the outer bag;
   first and second sidewall members attached to the opposing lateral edges and projecting away from the backing member, the first and second sidewall members being adapted to be positioned proximate to and extend over at least a portion of corresponding lateral side panels of the outer bag; and
   a top member attached to the top edge and projecting away from the backing member, the top member being adapted to be positioned proximate to and extend over at least a portion of the top panel of the outer bag.

20. The shield structure according to claim 19, further comprising an attachment clamp engageable with a vacuum cleaner.

21. The shield structure according to claim 19 wherein at least one airflow aperture is disposed through the backing member.

22. The shield structure according to claim 19 wherein at least one of the top, backing or sidewall members is spaced apart from the corresponding top, back or lateral side panels of the outer bag forming a compartment therebetween.

23. The shield structure according to claim 22, further comprising a door hingeably attached to the at least one top, back, or side members.

24. The shield structure according to claim 19 wherein the first and second sidewall members are connected to opposing lower portions of the backing member and form airflow gaps between the first and second sidewall members and the top member.

25. The shield structure according to claim 19, further comprising at least one tool-retaining recess disposed therein.

26. A shield structure for use on the exterior of a flexible outer bag of a vacuum cleaner having rear and side panels, comprising:

a backing member adapted to attach to the vacuum cleaner, the backing member being further adapted to be positioned proximate to and extend over at least a portion of the rear panel of the outer bag; and first and second sidewall members attached to opposing lateral edges of the backing member, the first and second sidewall members being adapted to be positioned proximate to and extend over at least a portion of corresponding side panels of the outer bag.

27. The shield structure according to claim 26 wherein at least one airflow aperture is disposed through the backing member.

28. The shield structure according to claim 26 wherein the flexible outer bag is attached to the shield structure.

29. The shield structure according to claim 26 wherein at least one of the backing or sidewall members is spaced apart from the corresponding back or side panels forming a compartment therebetween.

30. The shield structure according to claim 26, wherein the flexible outer bag has a front panel, the shield structure further comprising a front member attached to and extending between the first and second sidewall members, the front member being adapted to be positioned proximate to and extend over at least a portion of the front panel.

31. A shield structure for use on the exterior of a flexible outer bag of a vacuum cleaner having a rear panel and first and second side panels, comprising:

first and second backing members adapted to attach to the vacuum cleaner, the first and second backing members being adapted to be positioned proximate to and extend over first and second portions of the rear panel of the outer bag; and first and second sidewall members attached to opposing lateral edges of the first and second backing members, respectively, the first and second sidewall members being adapted to be positioned proximate to and to extend over at least a portion of the corresponding first and second side panels of the outer bag.

32. The shield structure according to claim 31, wherein the flexible outer bag has a front panel, the shield structure further comprising a front member attached to and extending between the first and second sidewall members, the front member being adapted to be positioned proximate to and extend over a portion of the front panel.

33. A method of partially shielding a flexible outer bag of a vacuum cleaner, comprising:

providing a shielding structure having a first shielding member extending partially over a first outer panel of the flexible outer bag; and providing the shielding structure with a second shielding member projecting away from the first shielding member and extending partially over a second outer panel of the flexible outer bag.

34. The method according to claim 33, further comprising providing the shielding structure with a third shielding member projecting away from the first or second shielding members and extending partially over a third outer panel of the flexible outer bag.

35. The method according to claim 33, further comprising providing increased airflow through the shielding structure.

36. The method according to claim 33, further comprising providing at least one airflow aperture through the shielding structure.

* * * * *